US012577081B2

(12) United States Patent
Baumgartner

(10) Patent No.: US 12,577,081 B2
(45) Date of Patent: Mar. 17, 2026

(54) OPERATION SYSTEMS AND METHODS FOR HOIST ELEVATORS

(71) Applicant: Designed Access LLC, Slinger, WI (US)

(72) Inventor: Chad Baumgartner, Slinger, WI (US)

(73) Assignee: DESIGNED ACCESS LLC, Slinger, WI (US)

( * ) Notice: Subject to any disclaimer, the term of this patent is extended or adjusted under 35 U.S.C. 154(b) by 1242 days.

(21) Appl. No.: 17/316,149

(22) Filed: May 10, 2021

(65) Prior Publication Data

US 2022/0177261 A1 Jun. 9, 2022

Related U.S. Application Data

(60) Provisional application No. 63/123,250, filed on Dec. 9, 2020.

(51) Int. Cl.

| | |
|---|---|
| ***B66B 1/14*** | (2006.01) |
| ***B66B 1/34*** | (2006.01) |
| ***B66B 1/46*** | (2006.01) |
| ***B66B 1/50*** | (2006.01) |
| ***B66B 1/52*** | (2006.01) |
| ***B66B 3/00*** | (2006.01) |

(52) U.S. Cl.

CPC .............. *B66B 1/14* (2013.01); *B66B 1/3461* (2013.01); *B66B 1/468* (2013.01); *B66B 1/50* (2013.01); *B66B 1/52* (2013.01); *B66B 3/002* (2013.01); *B66B 2201/102* (2013.01); *B66B 2201/406* (2013.01); *B66B 2201/463* (2013.01)

(58) Field of Classification Search

CPC ......... B66B 1/14; B66B 1/3461; B66B 1/468; B66B 1/50; B66B 1/52; B66B 3/002; B66B 2201/102; B66B 2201/406; B66B 2201/463; B66B 1/462

See application file for complete search history.

(56) References Cited

U.S. PATENT DOCUMENTS 6,615,175 B1 * 9/2003 Gazdzinski ............. B66B 3/006 704/E15.045
6,986,408 B2 1/2006 Takeuchi
(Continued)

FOREIGN PATENT DOCUMENTS

CN 205838237 U 12/2016
DE 2733441 2/1979
(Continued)

OTHER PUBLICATIONS

PCT/US2021/031593 International Search Report and Written Opinion of the International Searching Authority dated Sep. 17, 2021(16 pages).

(Continued)

*Primary Examiner* — Bickey Dhakal
(74) *Attorney, Agent, or Firm* — Amundsen Davis, LLC

(57) ABSTRACT

Systems and methods for hoist elevator system operation are provided. Hoist elevator operation systems and methods operate using a wireless network that may include a plurality of wireless technologies. Hoist elevator operation systems include a floor call station installed on a level or floor of a construction site, as well as a car controller paired to an operator panel and installed in a hoist elevator car. A remote server and a base station may also be provided.

20 Claims, 13 Drawing Sheets

(56) References Cited

U.S. PATENT DOCUMENTS

| | | | | |
|---|---|---|---|---|
| 2019/0112149 | A1* | 4/2019 | Wedzikowski | B66B 1/468 |
| 2020/0055694 | A1* | 2/2020 | Sokolov | B66B 9/00 |
| 2022/0048732 | A1 | 2/2022 | Adifon | |

FOREIGN PATENT DOCUMENTS

| | | | |
|---|---|---|---|
| DE | 102010015480 | | 10/2011 |
| EP | 3663251 | A1 | 6/2020 |
| JP | H08-198538 | | 8/1996 |
| WO | 00/34170 | | 6/2000 |

OTHER PUBLICATIONS

International Preliminary Report on Patentability, PCT Rule 44bis, International Application No. PCT/US2021/031593 dated Jun. 13, 2023, 8 pages.

Nov. 26, 2024 Office Action received from the USPTO for U.S. Appl. No. 18/680,369 (13 pages).

Non-Final Office Action issued Jul. 30, 2025 in U.S. Appl. No. 18/680,369 (continuation of U.S. Appl. No. 17/316,149) (10 pages).

Final Office Action dated May 8, 2025 in child application (continuation) U.S. Appl. No. 18/680,369 (10 pages).

Final Office Action mailed Dec. 22, 2025, issued in related U.S. Appl. No. 18/680,369, pp. 1-15.

* cited by examiner

OPERATION SYSTEMS AND METHODS FOR HOIST ELEVATORS

RELATED APPLICATIONS

This application claims priority to U.S. Provisional Application Ser. No. 63/123,250, filed on Dec. 9, 2020, the disclosure of which is hereby incorporated by reference in its entirety.

FIELD OF THE INVENTION

The present technology relates to systems and methods of operating hoist elevators, and more specifically to systems and methods for calling a temporary construction hoist elevator and determining which hoist elevator will respond to a call.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Hoist elevators are temporary elevators that are set up at construction sites for use by the construction workers. They may be installed on the outer wall of a building or other structure under construction, or in the elevator shaft, and are used for temporary transportation between floors or levels during construction.

In the past, a person would be assigned to act as the hoist elevator operator, and construction workers would yell to the operator, or communicate via walkie-talkies when they wanted to use the hoist elevator. The operator would then operate the hoist elevator to pick up the construction worker.

SUMMARY OF THE INVENTION

Systems and methods of the present technology include wireless systems for notification and calling of hoist elevator cars.

In one aspect, a hoist elevator operation system is provided. The hoist elevator operation system includes a floor call station including an up indicator button, a down indicator button, and a wireless transmitter that transmits a floor call message when a user activates the up indicator button or the down indicator button. The hoist elevator operation system also includes a car controller comprising a wireless transceiver, where the wireless transceiver receives the floor call message from the floor call station wirelessly. The hoist elevator operation system further includes an operator panel operatively paired to the car controller including a display and a control panel, wherein the display of the operator panel provides a visual indication associated with the floor call message.

In another aspect, a method of controlling a hoist elevator car is provided that includes steps of: sending a floor call message from a floor call station via a wireless network to each of a plurality of car controllers, each car controller being associated with one hoist elevator car in the hoist elevator system; receiving the floor call message at each car controller, where each car controller sends the floor call message to an operator panel coupled to the car controller; displaying the floor call message on a display of each operator panel; and cancelling the floor call message at an operator panel associated with a hoist elevator car that answers the floor call.

BRIEF DESCRIPTION OF THE DRAWINGS

Specific examples have been chosen for purposes of illustration and description, and are shown in the accompanying drawings, forming a part of the specification.

DETAILED DESCRIPTION

Figure 1:
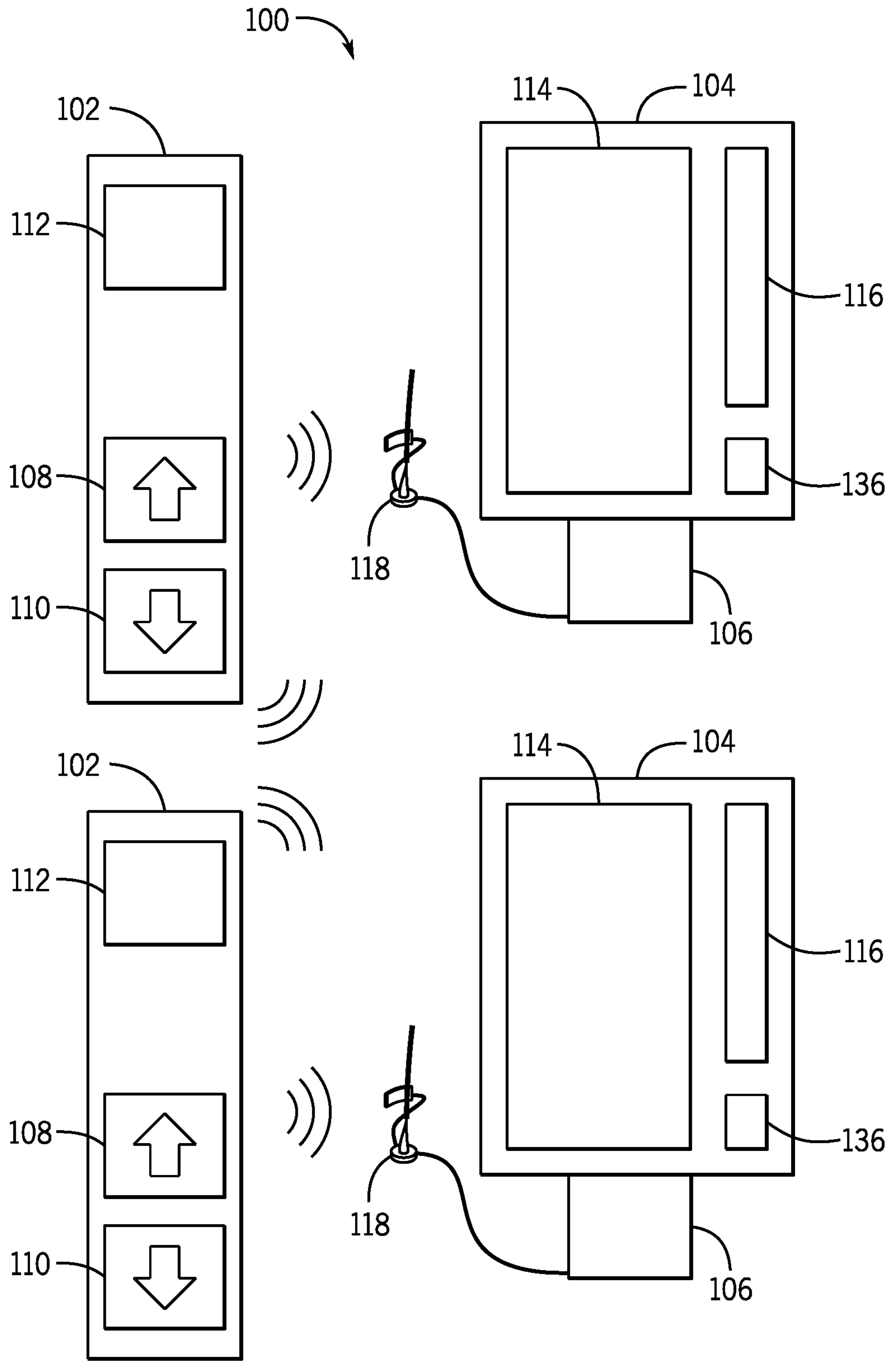
FIG. 1 illustrates one example of a hoist elevator operation system of the present technology.

Systems and methods of the present technology include wireless systems for controlling hoist elevator cars. Systems of the present technology may be compatible with different software and hardware platforms and may be configured to be integrated with pre-existing hoist elevator systems.

Hoist elevator operation system of the present technology, such as systems 100 and 300 discussed below, use any suitable wireless technology, including RF, LoRa, cellular, wifi, gps, GLONASS, and other suitable LAN and WAN wireless technologies. In one example, a hoist elevator operation system of the present technology may use a radio frequency (RF) signal based wireless network. In another example a hoist elevator operation system of the present technology may use a LoRa based wireless network. In preferred examples, one or more wireless technologies are used in the wireless network. For example, each floor call station may transmit messages via a wireless technology of a first type, such as RF, and each car controller may transmit messages via a wireless technology of a second type, such as LoRa. In some examples, various components may be able to receive and/or transmit messages via a plurality of wireless formats. For example, each car controller may be configured to receive messages using RF, LoRa, or RF, LoRa and cellular. Each car controller may also be configured to transmit messages via LoRa and cellular.

The wireless transmission range of a calling device of the present technology is preferably configured to cover the height of the structure under construction. In at least one example, the wireless transmission range may be up to about 500 feet, such as when RF signals are being used. In such an example, one or more amplifiers may be used to increase the wireless transmission range to up about 1500 feet or up to about 5000 feet. In other examples, the wireless transmission range may be farther. For example, in one example when LoRa is used, the wireless transmission range may up to about a mile or even further if there are no obstructions.

Referring to FIGS. 1-5, one example of a hoist elevator operation system 100 of the present technology includes a floor call station 102, an operator panel 104, and a car controller 106. Hoist elevator operation system 100 is intended to be used in a hoist elevator that has an elevator operator in each hoist elevator car, and may be used in hoist elevator configurations having at least one hoist elevator car.

Figure 2:
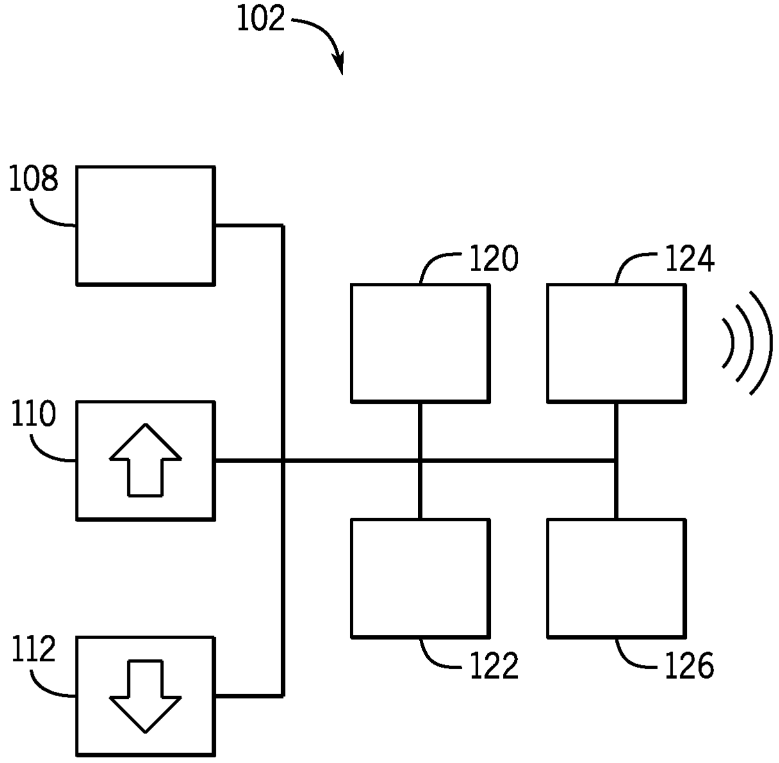
FIG. 2 illustrates a floor call station of the system of FIG. 1.

Each floor call station 102 may be configured to be mounted to a surface such as a wall or joist, at a location within a level of the construction site where a user would stand to call a hoist elevator car. The hoist elevator operation system 100 may include a plurality of floor call stations 102, one for each level of the construction site that the hoist elevator services. As shown in FIGS. 1 and 2, each floor call station 102 includes a plurality of buttons that may be used to call a hoist elevator car, including at least an up indicator button 108 and a down indicator button 110. Each floor call station 102 may also include an emergency button 112, which may be used to indicate that there is an emergency on the level of the construction site where the floor call station 102 is mounted.

Each floor call station may include at least one floor call station processor 120, a floor call station memory 122, and a floor call station transmitter 124 configured to transmit wireless signals, such as RF signals, to each car controller 106. The floor call station memory 122 may include at least one non-volatile memory that stores a floor call station protocol that, when read and executed by the at least one floor call station processor 120, provides for the control and operation of the floor call station 102.

Each floor call station 102 may be battery powered. In at least one example, each floor call station 102 may be powered by an alkaline battery 126, which may last up to about two years before needing to be replaced.

Referring to FIG. 1, hoist elevator operation system 100 may include one or more operator panels 104 and one or more car controllers 106. For example, each hoist elevator car may have one operator panel 104 and one car controller 106 operatively installed therein. Each car controller 106 may have an operator panel 104 paired with and operatively connected thereto. The operator panel 104 and car controller 106 may be powered by any suitable power source. In one example, the operator panel 104 and car controller 106 may be powered by one or more batteries. In the illustrated example, the operator panel 104 and car controller 106 may be connected to and receive power from the hoist elevator car, such as 110V power.

Figure 4:
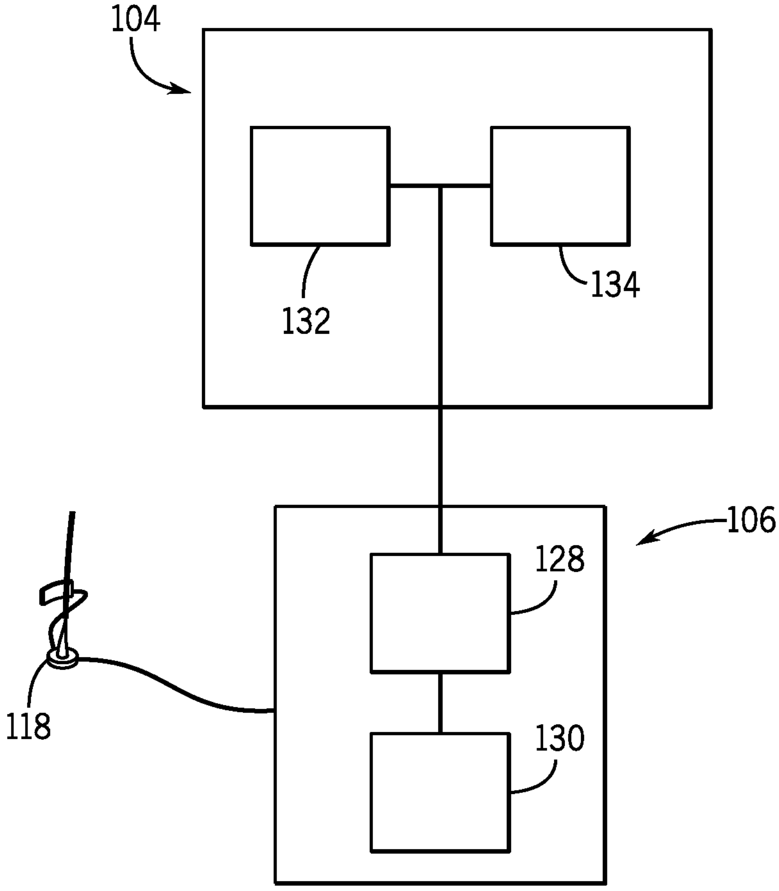
FIG. 4 illustrates a car controller and an operator panel of the system of FIG. 1.

Referring to FIGS. 1 and 4, each car controller 106 is paired with the operator panel 104 installed in the same hoist elevator car. The pairing of the devices may be wired or wireless.

The car controller 106 may include at least one car controller processor 128, a car controller memory 130, and a car controller transceiver 118 configured to receive and transmit wireless signals in one or more wireless transmission formats. For example, the car controller transceiver 118 may be configured to receive RF signals from each of the floor call stations 102, and to transmit LoRa signals to each of the other car controllers 106 in the hoist elevator operation system. The car controller memory 130 may include at least one non-volatile memory that stores a car controller protocol that, when read and executed by the at least one car controller processor 128, provides for the control and operation of the operator panel 104 and the hoist elevator car in which the car controller 106 is installed.

The operator panel 104 includes a display 114. The operator panel 104 also includes a control panel 116, which may be separate from the display 114 or may be built into the display 114 in the form of a touchscreen.

The operator panel 104 may be a tablet computing device, and may include at least one operator panel processor 132 and an operator panel memory 134. The operator panel memory 134 may include at least one non-volatile memory that stores an operator panel protocol that, when read and executed by the at least one operator panel processor 132, provides for the control and operation of the operator panel 104. Alternatively, in examples where the operator panel 104 does not have its own processor and memory, the operator panel protocol may be stored in the car controller memory 130 and executed by the car controller processor 128.

The components of the hoist elevator operation system 100 are operatively connected through a wireless network, and are configured to send and receive wireless transmissions from devices within the hoist elevator operation system 100. In one example, RF signals are used for wireless transmissions. In such an example, the floor call station transmitter 124 of the floor call station 102 may be configured to transmit an RF signal to the car controller transceiver 118 of each of the car controllers 106 in the hoist elevator operation system when a user presses the up indicator button 108 or the down indicator button 112. Each car controller transceiver 118 receives the RF wireless signals from the floor call station transmitter 124 and translates the signals into a floor call message that includes the called floor number and called direction of travel associated with the call. Each car controller 106 sends the floor call message to the operator panel 104 paired with the car controller 106. The paired operator panel 104 displays the floor call message on the display 114. The floor call message may thus be displayed on each of the operator panels 104 in the hoist elevator operation system. Accordingly, the display 114 of the operator panel provides a visual indication associated with the floor call message.

Figure 3:
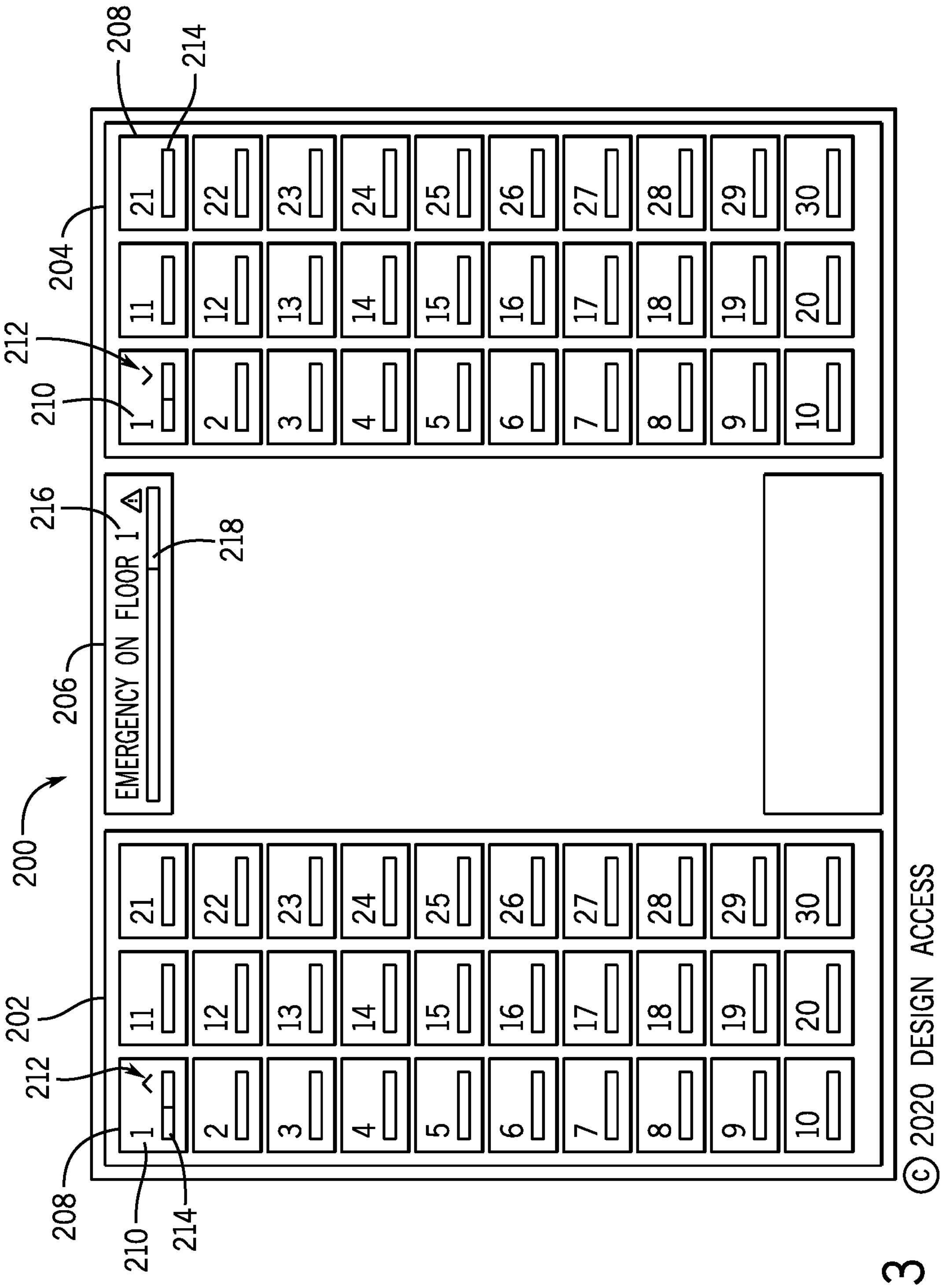
FIG. 3 illustrates a graphical user interface that may be used in a hoist elevator operation system of FIG. 1.

The display 114 of the operator panel 104 may include a graphical user interface, such as graphical user interface 200 shown in FIG. 3. Graphical user interface 200 may include an up call panel 202, a down call panel 204 and an emergency call icon 206. The up call panel 202 and the down call panel 204 may each include a plurality of floor icons 208, preferably one floor icon 208 for each floor of the construction site to which the associated hoist elevator car travels. Each floor icon 208 may include a floor number 210, and a travel direction arrow 212. Each floor icon may also include a call duration timer 214. Each floor icon 208 may have at least two operational states, a selected state in which the floor icon is illuminated or shown in a first color, such as the indicator for floor 1 in the up call panel 202 and the down call panel 204 of FIG. 3, and an unselected state in which the floor icon is not illuminated or is shown in a second color, such as the indicator for floors 2-30 in the up call panel 202 and the down call panel 204 of FIG. 3. When the operator panel 104 receives a floor call message, the floor icon 208 for the called floor number may illuminate on the up call panel 202 if the called direction is up and on the down call panel 204 if the call direction is down. In examples using a call duration timer 214, the call duration timer may be pre-set to any desired length of time, such as from about 30 seconds to about 5 minutes. When the call duration timer 214 is disabled, an operator may be required to clear calls manually, such as by using the touch screen. When the operator panel 104 receives a floor call message and the floor icon 208 for the called floor number is illuminated, the call duration timer 214 of the illuminated floor icon 208 may start to count down. If the timer expires without the floor call being answered, the call duration timer 214 may flash continuously until the call is answered. When a hoist elevator operator answers a floor call by directing a hoist elevator car to the relevant floor, the call may be cancelled. In some examples, the call may be cancelled by the hoist elevator operator, such as by pressing a button for the floor on the control panel 116. In examples where the control panel 116 is implemented through a touchscreen, the hoist elevator operator may press the floor icon 208 to cancel the call. In other examples, the call may be cancelled automatically, such as through the use of an arrival sensor 902, discussed in more detail below. When the floor call is cancelled, the car controller 106 of the elevator car that answered the floor call sends a cancellation message via the wireless network to the other car controllers 106 in the hoist elevator system. When the other car controllers receive a cancellation message, they communicate the cancellation to their paired operator panel 104, and the paired operator panel 104 turns off the illumination of the floor icon 208 associated with the cancelled call on its display 114.

When someone hits the emergency button 108 on a floor call station 102, the floor call station sends an emergency message via the wireless network to each car controller 106 in the hoist elevator system. Each car controller 106 sends the emergency message to its paired operator panel 104, and each operator panel 104 illuminates the emergency call icon 206 on its graphical user interface 200. The operator panel 104 may also cause the entirety or a portion of the graphical user interface 200 to flash or change color to indicate the emergency. The emergency call icon 206 may include a emergency floor indicator 216 and an emergency timer 218. Once the emergency call icon 206 is illuminated, the emergency timer 218 may start to count down, to give an indication of the length of time of the emergency.

Referring to back to FIG. 1, in some examples, the operator panel 104 may also include a speaker 136, and the operator panel 104 may emit an audible alarm through the speaker 136 when an emergency message is received. The speaker 136 may also provide other audible indications, such as providing an audible indication associated with the floor call message.

Figure 5:
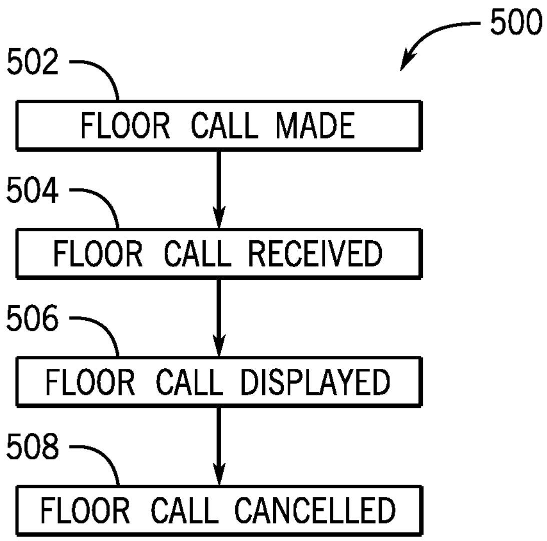
FIG. 5 illustrates a flow chart of a method of operating a hoist elevator operation system of the present technology.

FIG. 5 illustrates one method 500 of operating a hoist elevator system of the present technology, such as hoist elevator system 100. The method starts at step 502, when someone calls for a hoist elevator, such as by pressing the up indicator button 108 or the down indicator button 110 on a floor call station 102. A floor call message is sent from the floor call station 102 via the wireless network, such as by using RF signals, to each car controller 106 in the hoist elevator system. At step 504, each car controller 106 receives the floor call message, and sends the floor call message to its paired operator panel 104. At step 506, each operator panel 104 displays the floor call message. When a hoist elevator car responds to the call by arriving at the called floor, the hoist car elevator cancels the floor call at step 508.

A second example of a hoist elevator operation system 300 of the present technology is shown in FIGS. 6-12. Hoist elevator operation system 300 includes a floor call station 302, an operator panel 304, and a car controller 306. Hoist elevator operation system 300 also includes a remote server 308, which may be a cloud based server, and a base station 310. Hoist elevator operation system 300 is suitable for use with hoist elevator systems having any number of hoist elevator cars, and is particularly useful in hoist elevator systems having at least two hoist elevator cars.

Hoist elevator operation systems o the preset technology, such as hoist elevator operation system 300 may include a plurality of floor call stations 302, operator panels 304, and car controllers 306. For example, hoist elevator operation system 300 may include one floor call station 302 on each floor or level of the construction site. Additionally, each hoist car elevator in use at a construction site may include a car controller 306 and an operator panel 304, with the car controller 306 being operatively paired to the operator panel. 304.

The components of the hoist elevator operation system 300 are operatively connected through a wireless network, which may utilize one or more wireless technologies.

Figure 6:
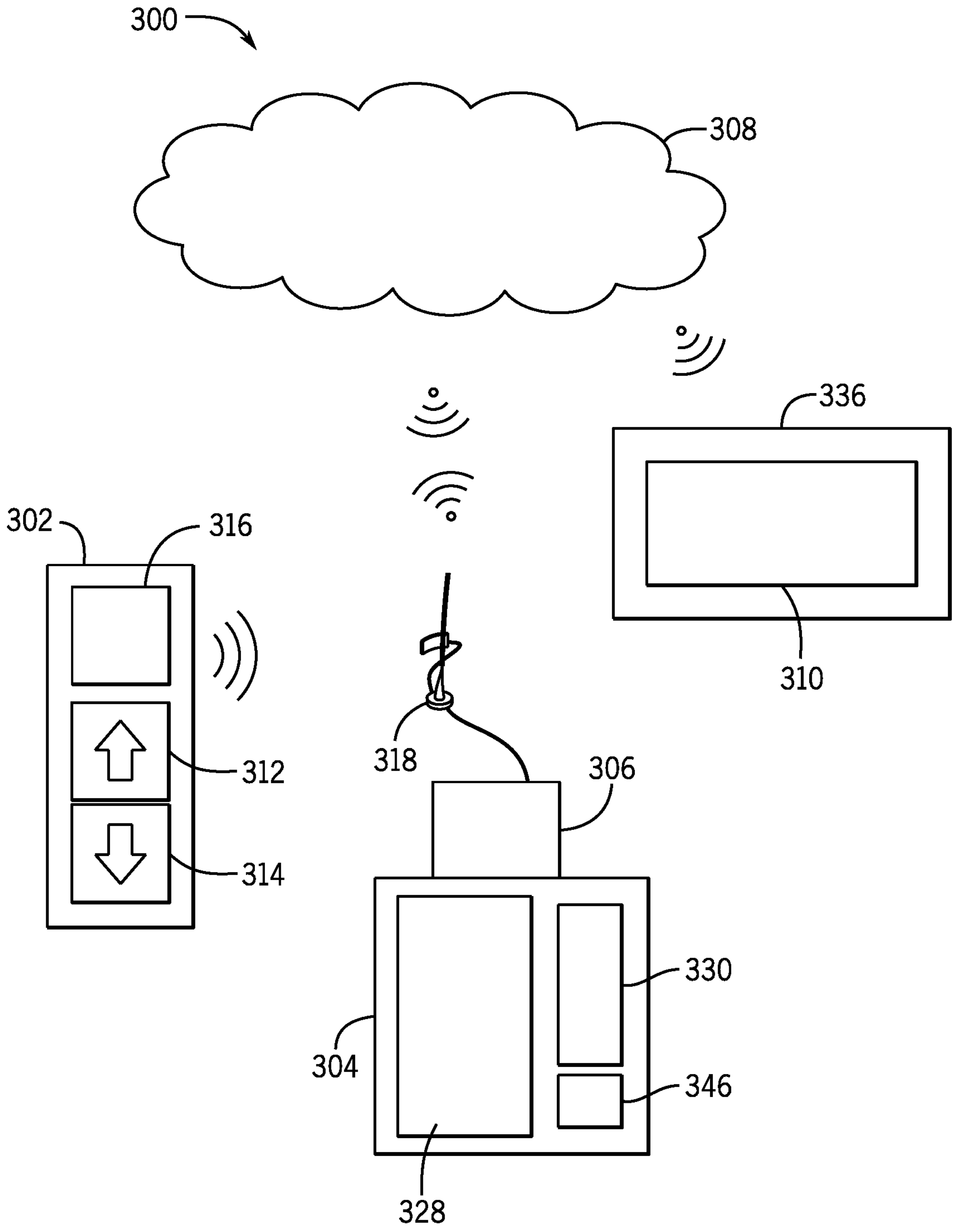
FIG. 6 illustrates a second example of a hoist elevator operation system of the present technology.
Figure 7:
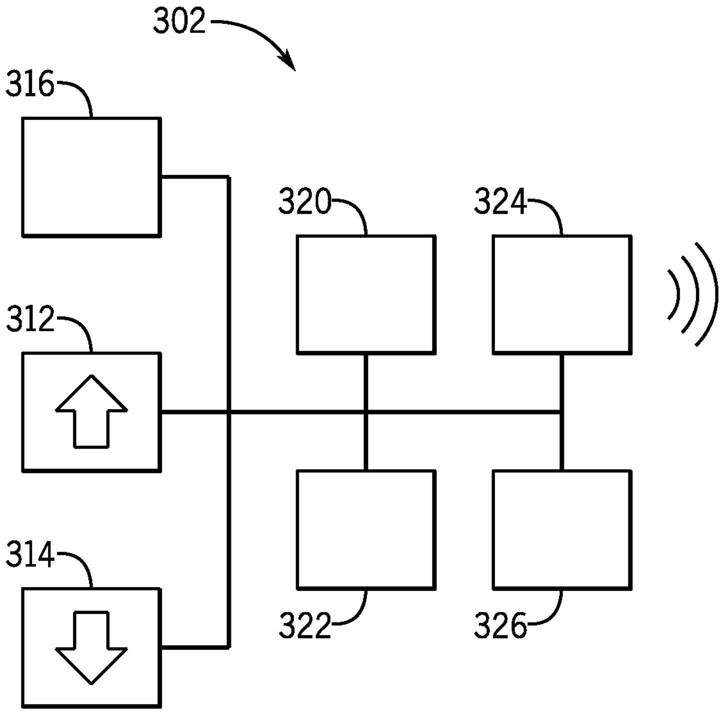
FIG. 7 illustrates a floor call station of the system of FIG. 6.

Each floor call station 302 may be configured to be mounted to a surface such as a wall or joist, at a location within a level of the construction site where a user would stand to call a hoist elevator car. The hoist elevator operation system 300 may include a plurality of floor call stations 302, one for each floor or level of the construction site that the hoist elevator system services. As shown in FIGS. 6 and 7, each floor call station 302 includes a plurality of buttons that may be used to call a hoist elevator car, including at least an up indicator button 312 and a down indicator button 314. Preferably, the floor call station 302 also includes an emergency button 316, which may be used to indicate that there is an emergency on the level of the construction site where the floor call station 302 is mounted.

Each floor call station 302 may include at least one floor call station processor 320, a floor call station memory 322, and a floor call station transmitter 324 configured to transmit wireless signals. For example, the floor call station transmitter 324 may send messages to each car controller 306 using RF signals. The floor call station memory 322 may include at least one non-volatile memory that stores a floor call station protocol that, when read and executed by the at least one floor call station processor 320, provides for the control and operation of the floor call station 302.

Each floor call station 302 may be powered by any suitable source, such as being battery powered. In at least one example, each floor call station 302 may be powered by an alkaline battery 326, which may last up to about two years before needing to be replaced.

Referring to FIG. 6, hoist elevator operation system 300 may include one or more operator panels 304 and one or more car controllers 306. For example, each hoist elevator car may have one operator panel 304 and one car controller 306 operatively installed therein. Each car controller 306 may have an operator panel 304 paired with and operatively connected thereto. The operator panel 304 and car controller 306 may be powered by any suitable power source. In one example, the operator panel 304 and car controller 306 may be powered by one or more batteries. In the illustrated example, the operator panel 304 and car controller 306 may be connected to and receive power from the hoist elevator car, such as 110V power.

Figure 8:
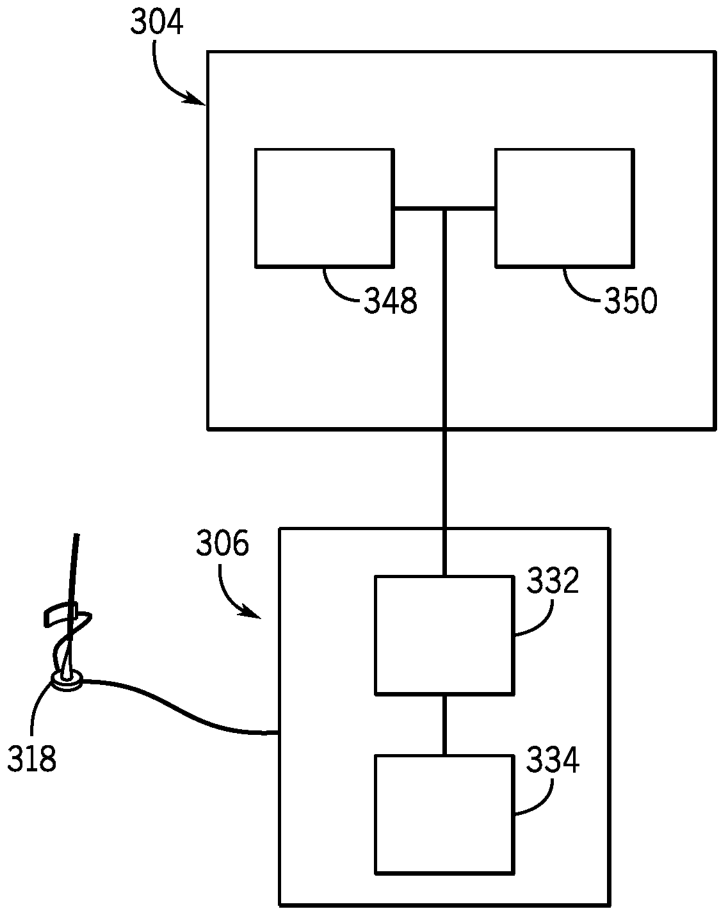
FIG. 8 illustrates a car controller and an operator panel of the system of FIG. 6.

Referring to FIGS. 6 and 8, each car controller 306 is paired with the operator panel 304 installed in the same hoist elevator car.

The car controller 306 may include at least one car controller processor 332, a car controller memory 334, and a car controller transceiver 318 configured to receive and transmit wireless signals in one or more wireless transmission formats. For example, the car controller transceiver 318 may be configured to receive RF signals from each of the floor call stations 302, to transmit LoRa signals to and receive LoRa signals from each of the other car controllers 306 in the hoist elevator operation system, and to transmit cellular signals and receive cellular signals from the remote server 308. The car controller memory 334 may include at least one non-volatile memory that stores a car controller protocol that, when read and executed by the at least one car controller processor 332, provides for the control and operation of the car controller 306.

The operator panel 304 includes a display 328. The operator panel 304 also includes a control panel 330, which may be separate from the display 328 or may be built into the display 328 in the form of a touchscreen.

The operator panel 304 may be a tablet computing device, and may include at least one operator panel processor 348 and an operator panel memory 350. The operator panel memory 350 may include at least one non-volatile memory that stores an operator panel protocol that, when read and executed by the at least one operator panel processor 348, provides for the control and operation of the operator panel 304. Alternatively, in examples where the operator panel 304 does not have its own processor and memory, the operator panel protocol may be stored in the car controller memory 334 and executed by the car controller processor 332.

The components of the hoist elevator operation system 300 are operatively connected through a wireless network, and are configured to send and receive wireless transmissions from devices within the hoist elevator operation system 300. In one example, the floor call station transmitter 324 of the floor call station 302 may be configured to transmit an RF signal to the car controller transceiver 318 of each of the car controllers 306 in the hoist elevator operation system 300 when a user presses the up indicator button 312 or the down indicator button 314. Each car controller transceiver 318 receives the RF wireless signals from the floor call station transmitter 324 and translates the signals into a floor call message that includes the called floor number and called direction of travel associated with the call. Each car controller 306 sends the floor call message to the operator panel 304 paired with the car controller 306. The paired operator panel 304 displays the floor call message on the display 328. The floor call message may thus be displayed on each of the operator panels 304 in the hoist elevator operation system.

Figure 9:
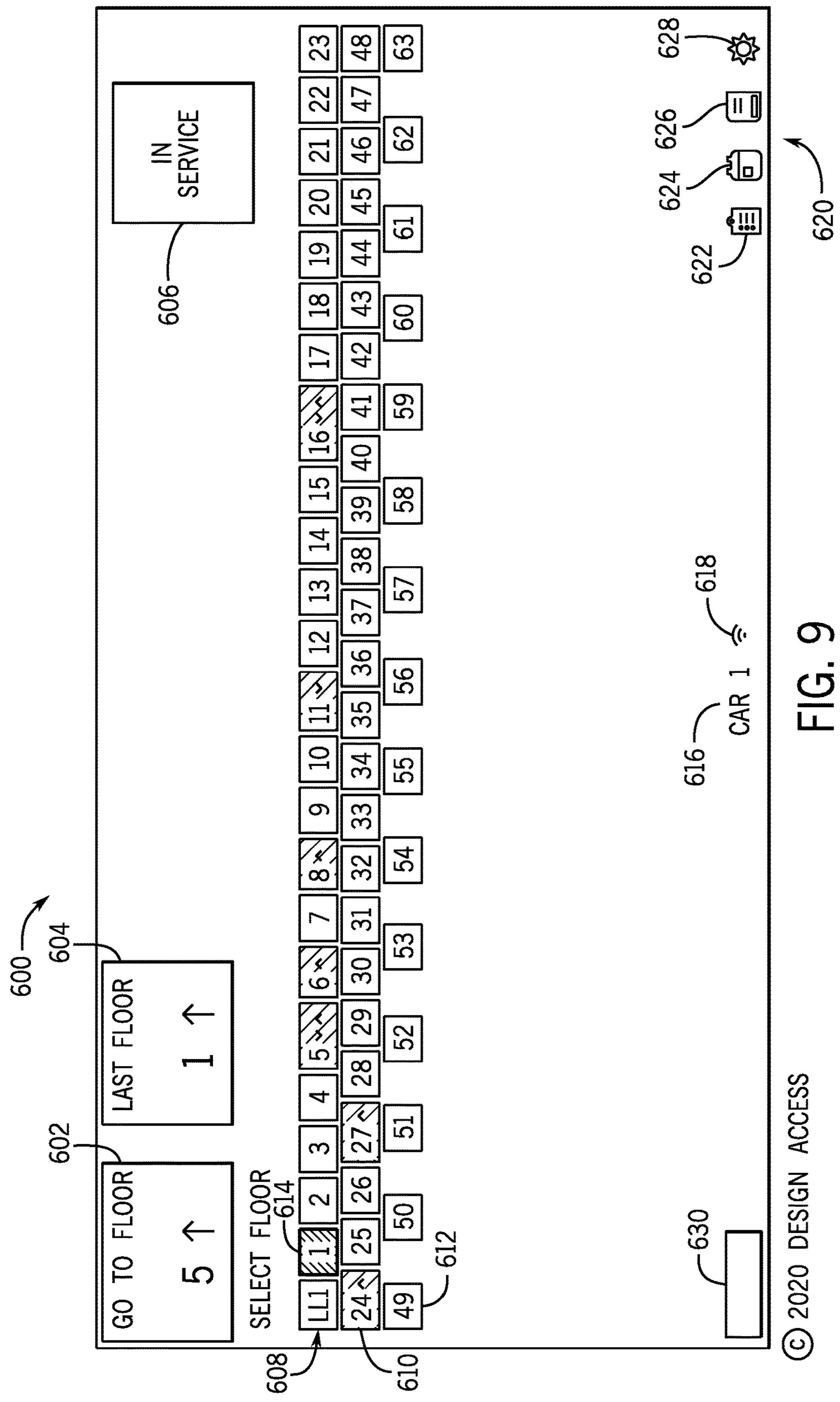
FIG. 9 illustrates a graphical user interface that may be used with an operator panel of the hoist elevator operation system of FIG. 6.

The display 328 of the operator panel 304 may include a graphical user interface, such as graphical user interface 600 shown in FIG. 9. Graphical user interface 600 may include a go to floor indicator 602, which indicates the floor to which the hoist elevator car is assigned to travel next and optionally also the direction of travel that the hoist elevator car is assigned take. The operator panel 304 may alter the go to floor indicator 602 based on a go to floor assignment received from the remote server 308. The graphical user interface 600 may also include a past floor indicator 604, which may indicate the last floor to which the hoist elevator car traveled and optionally the direction the elevator was traveling to arrive at the last floor.

The graphical user interface 600 may include a status icon 606, which indicates the operation status of the hoist elevator car, such as "in service" or "out of service." The status icon 606 may be may open an out of service reason menu when activated by a hoist elevator operator. When a hoist elevator car is going out of service, the hoist elevator operator may activate to the status icon and select the appropriate reason for going out of service. The reasons for going out of service may include one or more of the following reasons: operator break, scheduled delivery, max capacity, inspection, maintenance, end of shift, and other.

The graphical user interface 600 may further include a plurality of floor icons 608, preferably one for each floor to which the hoist elevator car is capable of traveling. Each floor icon 608 may have at least three states of operation. The first state may be a selected state 610, indicating that a call has been made to that floor. A floor icon 608 in a selected state 610 may be displayed in a first color, and may include a directional indicator showing the direction of travel associated with the call. The second state may be an unselected state 612, indicating that there are no calls currently for that floor. A floor icon 608 in an unselected state 612 may be displayed in a second color. The third state may be current floor state 614, indicating that hoist elevator car is currently located at that floor. A floor icon 608 in a current floor state 614 may be displayed in a third color.

Additional indicators may also be included in the graphical user interface 600. For example, the graphical user interface 600 may include a car identification indicator 616, which indicates the name or identity of the hoist elevator car, such as "Car 1." Additionally, a signal indicator 618 may be provided, which indicates the strength of the signal of the wireless network on which the hoist elevator operation system is operating. The graphical user interface 600 may also provide a menu 620 of other icons, each of which may open a new screen or cause additional information to be displayed.

For example, the menu 620 may include a daily inspection icon 622. Currently, each hoist elevator operator is required to fill out a daily hoist elevator car inspection report. When the daily inspection icon 622 is activated by a hoist elevator operator, a daily inspection screen may open, and the hoist elevator operator may fill out and submit the daily inspection report. The car controller 306 may receive the daily inspection report and send it to the remote server 308 via the wireless network. The remote server may send the daily inspection report to one or more designated recipients via any suitable communication method, such as cellular call, test message, or e-mail.

As another example, the menu 620 may include calendar icon 624. When the calendar icon 624 is activated by a hoist elevator operator, a calendar showing any deliveries scheduled to the hoist elevator car may be displayed. For example, if a delivery of materials is scheduled to be made to the construction site at a particular time on a particular day, a gatekeeper may assign a specific hoist elevator car to be available to receive the delivery. The gatekeeper may add the delivery to the calendar for the assigned hoist elevator car, The calendar may then be updated by the remote server 308 sending a calendar update message to the car controller 306 of the assigned hoist elevator car. The operator panel 304 may then receive the calendar update message from the car controller 306, elevator operator may then see the scheduled delivery on the calendar.

The menu 620 may also include an operator manual icon 626. When the operator manual icon 626 is activated by a hoist elevator operator, the navigable electronic copy of the operator manual may be displayed. Current regulations require that the operator manual be provided to each hoist elevator car. Providing the operator manual to be accessed electronically may be one way to satisfy that regulation.

The menu 620 may also include a Night/Day icon 628. When the operator Night/Day icon 628 is activated by a hoist elevator operator, the graphical user interface may toggle between a day setting and a night setting, which may change the color scheme and/or the brightness of the graphical user interface 600.

The graphical user interface may also include a programming mode icon 630. When a hoist elevator car is being installed and set up at a construction site, the hoist elevator operator may activate the programming mode icon 630, and the operator panel 304 will enter into a programming mode. The programming mode may be used to enter settings, such as elevations defining floor levels, associated with operation of the hoist elevator car.

Referring back to FIG. 6, the remote server 308 is configured to send and receive wireless signals from each car controller 306, and to also send signals to the base station 310. The remote server may be operatively connected to each car controller 306 and to the base station 310 through the wireless network, and may use any suitable wireless technology, such as cellular. The remote server 308 includes server logic that when executed by the server causes the server to send messages to control at least certain aspects of the control panel 304 in each hoist elevator car and/or the base station 310. A remote user, such as a gatekeeper, may access and interact with the server logic via an access portal, which may be provided through a website or application.

Figure 12:
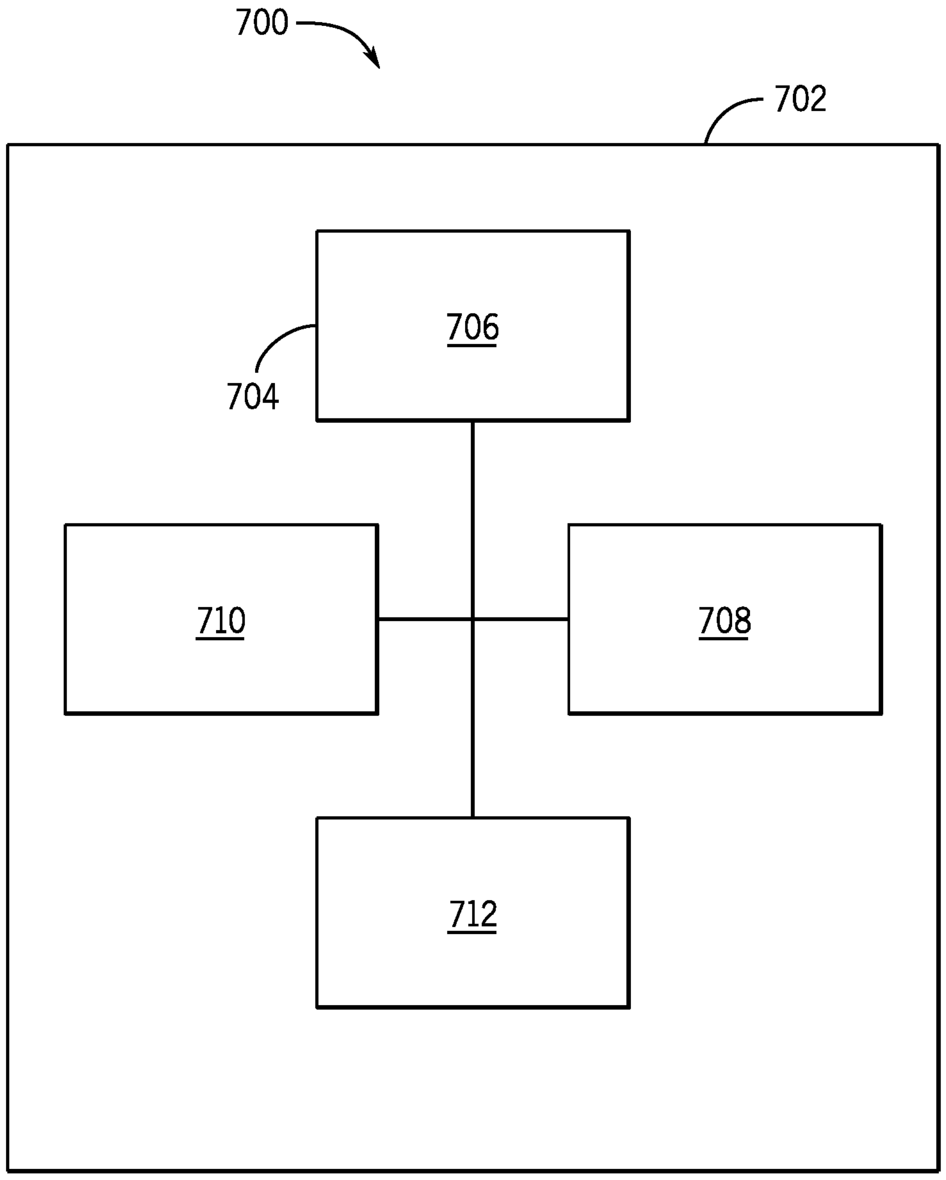
FIG. 12 illustrates server logic in a memory of the remote server of the system of FIG. 6.

One example of server logic 700 that may be used with the hoist elevator operation systems of the present technology is shown in FIG. 12. Server logic may be stored on a server memory 702, which may be non-volatile memory. Server logic 700 may include a plurality of modules 704 (such as modules 706, 708, 710 and 712), which may be interconnected as needed. Each server logic module 704 may be configured to: receive messages from a remote user, a car controller 306, and/or the base station 310, as appropriate; process the received messages; and configure messages that are sent from the remote server 308 to a remote user, a car controller 306, and/or the base station 310, as appropriate.

For example, when a car controller 306 receives a floor call message form a floor call station 302, the car controller 306 may send the floor call message to the remote server, which may direct the floor call message to hoist elevator car scheduling module 706. hoist elevator car scheduling module 706 may process the floor call message, along with any other floor call messages that have also been received, using a scheduling algorithm, and may determine an operation schedule for each hoist elevator car based at least partially on the received floor call messages and the scheduling algorithm. The scheduling algorithm may include factors such as: current hoist elevator car location of each hoist elevator car, current direction of travel of each hoist elevator car, current capacity of each hoist elevator car, maximum capacity of each hoist elevator car, current operational status of each hoist elevator car, current existing floor calls, recently cancelled floor calls, location of the floor call, and current wait time elapsed for each floor call. The scheduling module 706 may cause the remote server 308 to send scheduling messages to each car controller 306 to control the go to floor indicator 602 of the graphical user interface 600.

Additionally, when a hoist elevator car operator answers a floor call by directing a hoist elevator car to the relevant floor, the floor call may be cancelled. The car controller 306 of the hoist elevator car answering the floor call may send an arrival message to the remote server 308, and the remote server 308 may direct the arrival message to the car scheduling module 706. The car controller 306 may generate and send the arrival message based on input received from the hoist elevator operator through the control panel 304, or from an arrival sensor of the hoist elevator car. When the hoist elevator car includes an arrival sensor, the sensor may send an arrival signal to the car controller 306 once it senses that the hoist elevator car has arrived at the relevant floor of the construction site. The car scheduling module 706 may receive and process the arrival message, and then send a cancellation message to the car controllers 306 of each hoist elevator car that causes the graphical user interface 600 of each to alter the relevant floor icon from a selected setting to an unselected setting.

Another example of a server logic module may be an emergency module 708. When someone hits the emergency button 316 on a floor call station 302, the floor call station sends an emergency message via the wireless network to each car controller 306 in the hoist elevator system. Each car controller 306 sends the emergency message to its paired operator panel 304, and each operator panel 304 may cause an emergency notification to be displayed on its graphical user interface 600. Referring to back to FIG. 6, in some examples, the operator panel 304 may also include a speaker 346, and the operator panel 304 may emit an audible alarm through the speaker 346 when an emergency message is received. At least one car controller 306 may also send the emergency message to the remote server, and the remote server may direct the emergency message to the emergency module 708. The emergency module 708 may process the emergency message and send an emergency report to one or more designated recipients via any suitable communication method, such as cellular call, test message, or e-mail. The one or more designated recipients may include any of a construction site manager or any other recipient associated with the construction site, and/or an emergency services department, such as a police or fire department. In at least example, an emergency call sent by pressing the emergency call button on the floor call station on the first/ground floor is defined as indicating a fire at the construction site, and the emergency report sent by the emergency module 708 indicates that there is a fire based on the emergency call being placed at the first/ground level floor call station.

Another example of a server logic module may be a daily inspection report module 710 that may receive and send daily inspection reports as described above, or a calendar module 712 that may receive scheduled delivery notifications from a remote user and send updated calendar messages to car controllers 306 as described above. Other information modules may also be provided in the server logic 700. One such example is a weather module that receives and sends messages regarding the weather, such as the wind speed received from an anemometer that may be located on the construction site, such as at the top of one of the hoist elevator shafts.

The server logic 700 may collect data from the other components of the hoist car operation system, such as the car controllers 306, and may process the collected data to generate various reports that may sent to or accessible by a remote user. The reports generated may include any report that can be generated from the collected data, such as: wait time, run distance, amount of time a hoist elevator car is out of service for any selectable reason, etc.

Figure 10:
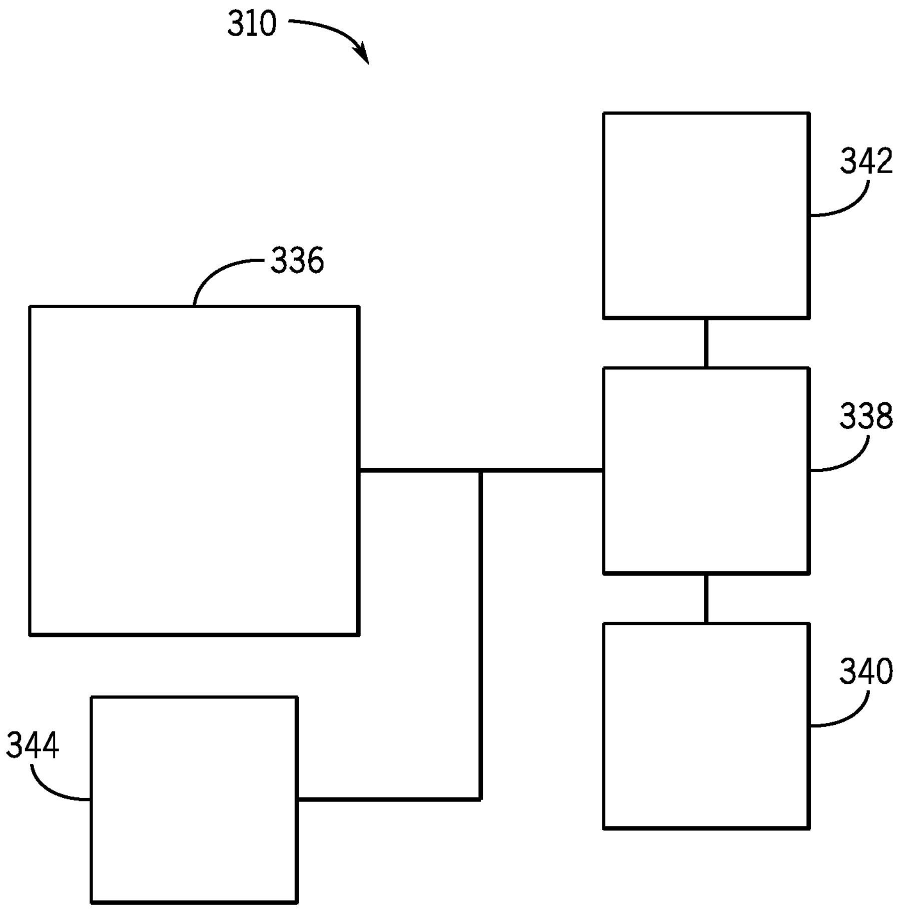
FIG. 10 illustrates a base station of the system of FIG. 6.

Referring to FIGS. 6 and 10, the base station 310 includes a base station display 336, at least one base station processor 338, a base station memory 340, and a base station transceiver 342. The base station transceiver 342 receives messages via wireless signals from the remote server 308. The base station memory 340 may include at least one non-volatile memory that stores a base station protocol that, when read and executed by the at least one base station processor 338, provides for the control and operation of the base station display 336. The base station display 336 may provide visual and audio information. The base station protocol may cause the at least one base station processor 338 to alter visual and/or audio information provided the base station display 336 based on the messages received from the remote server 308. The base station 308 may also include a base station control panel 344, which may be separate from the base station display 336 or may be built into the base station display 336 in the form of a touch-screen.

Figure 11:
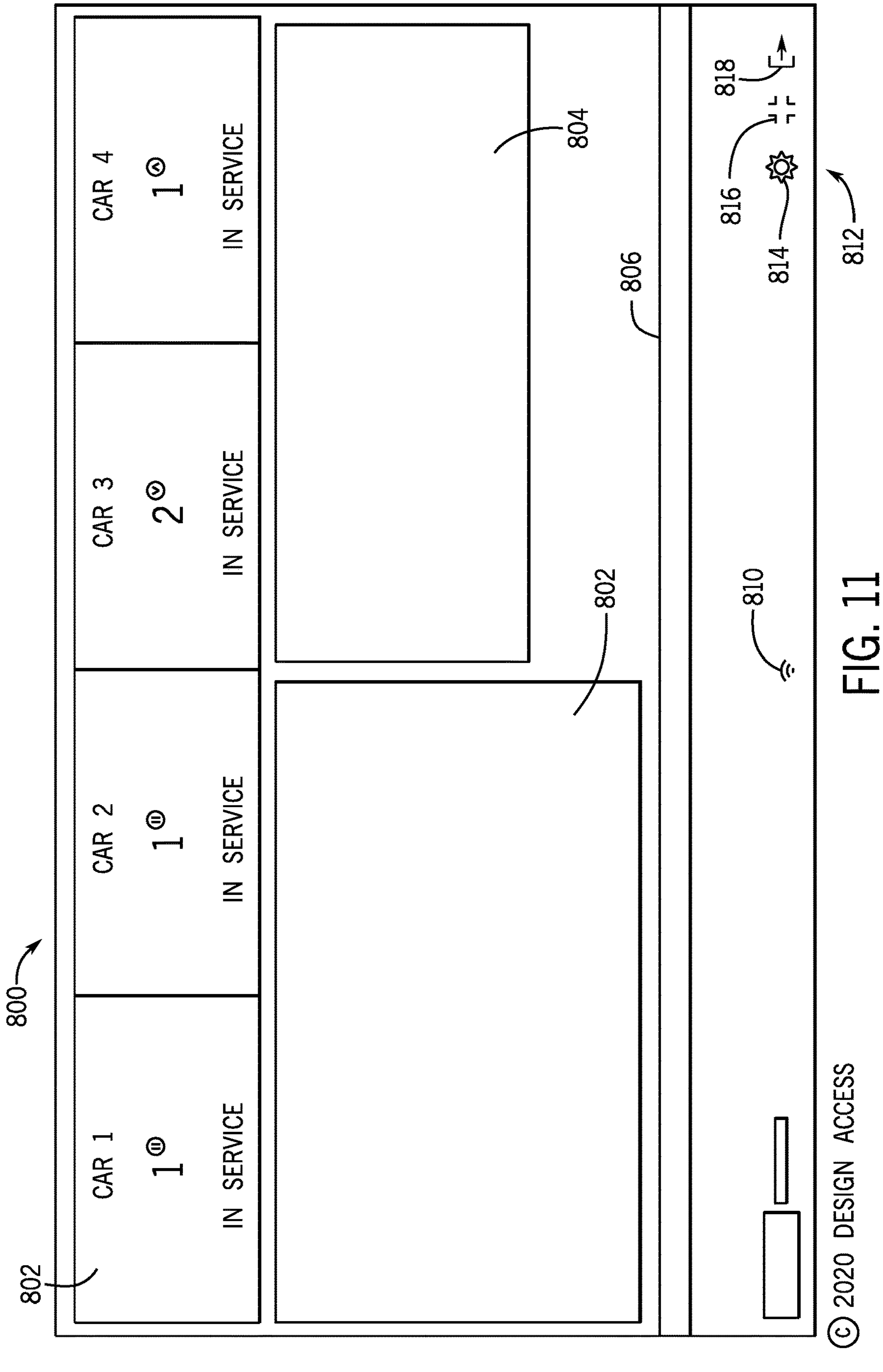
FIG. 11 illustrates a graphical user interface that may be used with a base station of FIG. 10.

The base station display 336 may include a graphical user interface, such as graphical user interface 800 shown in FIG. 11. Graphical user interface 800 may include a plurality of user information zones. A first zone may be a hoist elevator car status zone 802, which may indicate the current floor level and direction of travel for each hoist elevator car in the hoist elevator car system. Direction of travel may include an up indicator, down indicator, or a paused indicator (such as shown in FIG. 11). A second zone of graphical user interface 800 may be a video portal 802, which may play a video, such as a safety video, which may assigned by a remote user and sent to the base station 310 from the remote server. Another graphical user interface 800 may be a scheduled delivery zone 804, which may display information about any deliveries scheduled to arrive at the constructions site. The graphical user interface 800 may also include a message board zone 806, which may display a scrolling message.

The graphical user interface 800 may also include a plurality of icons. For example, the graphical user interface 800 may include a signal strength icon 810 that may indicate the signal strength of the wireless network. The graphical user interface 800 may also include setting icons 812. One type of setting icon is a Night/Day icon 814, which may toggle between a day setting and a night setting that may change the color scheme and/or the brightness of the graphical user interface 800. Another setting icon is full screen icon 817, which may toggle the graphical user interface between a full screen display mode and a partial screen display mode. A third type of setting icon is a toggle icon 818, which may shift the information in the display to include or be replaced with additional information, such as a weather report including the wind speed measured at the construction site.

Figure 13:
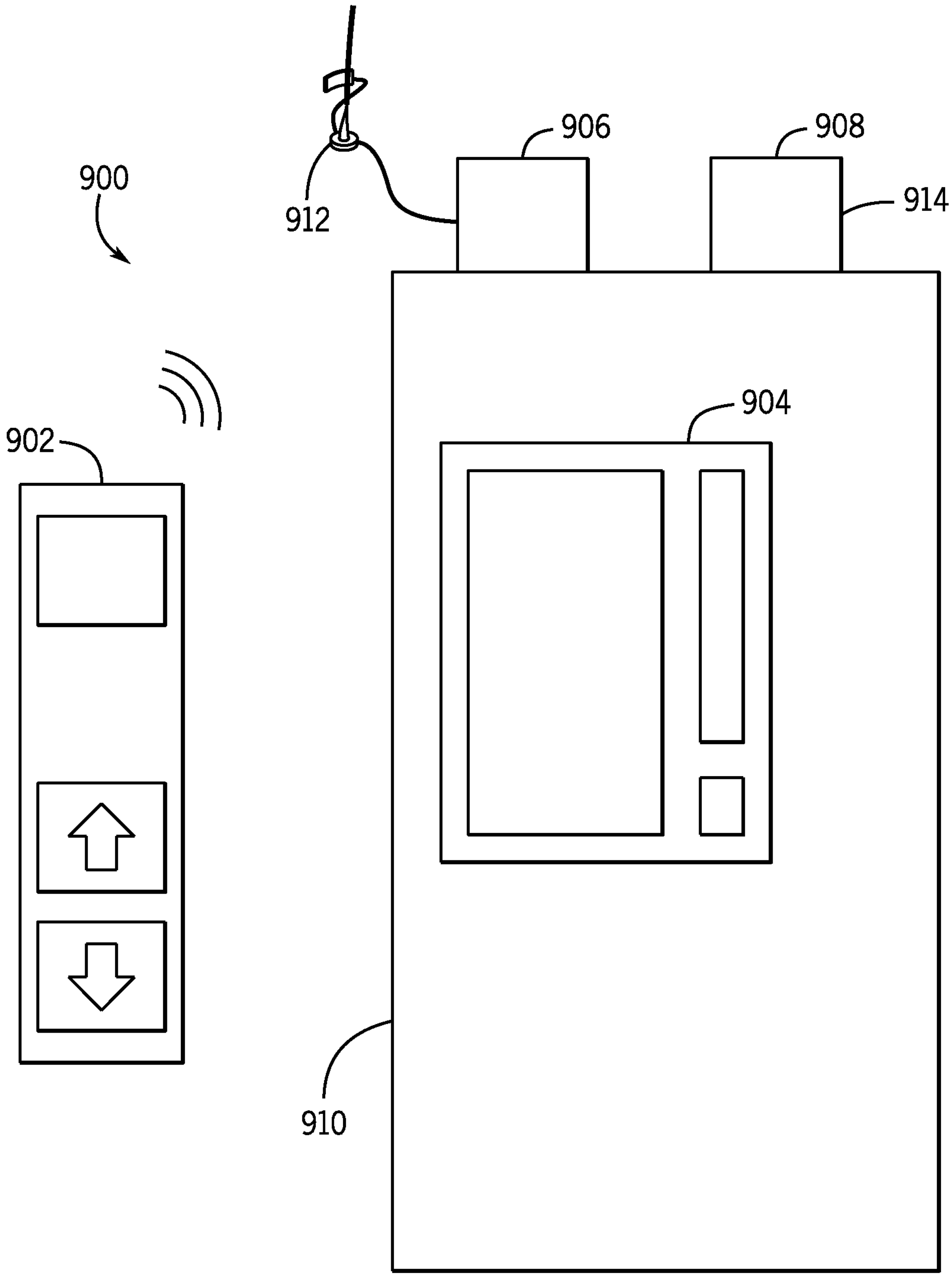
FIG. 13 illustrates another example of a hoist elevator operation system of the present technology that includes an arrival sensor.
Figure 14:
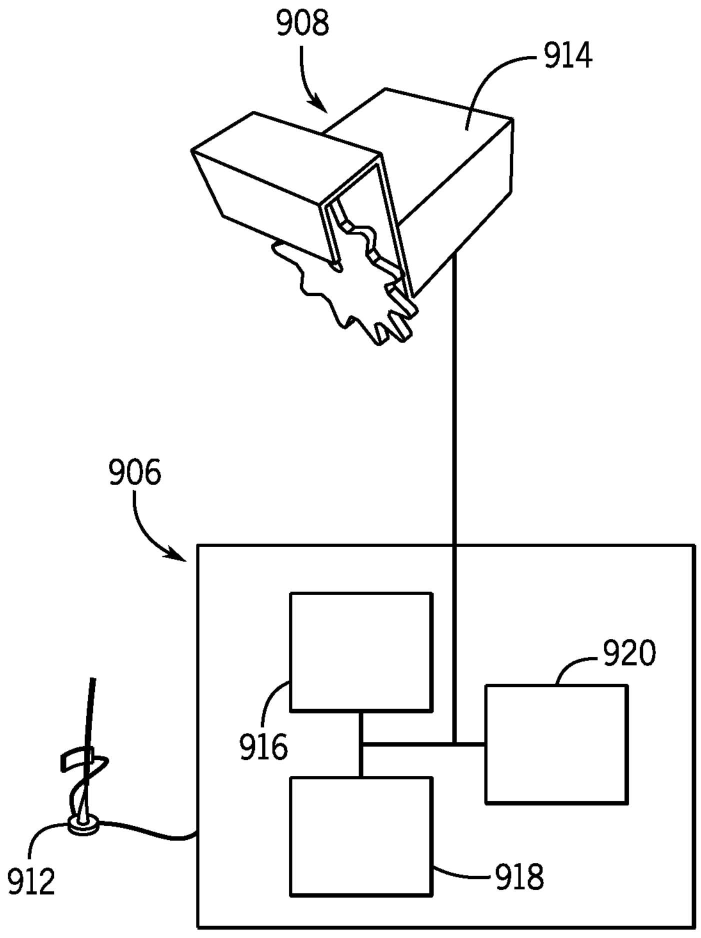
FIG. 14 illustrates a car controller and an encoder of the system of FIG. 13.

As discussed above, with respect to both hoist elevator operation systems 100 and 300, when a hoist elevator car arrives at a called floor, the floor call may be cancelled. In some examples, the floor call is cancelled automatically by the car controller, based on input received from an arrival sensor. FIGS. 13 and 14 illustrate a hoist elevator system 900 that includes an arrival sensor 908. The hoist elevator system 900 may be a hoist elevator system of the same type as either hoist elevator system 100 or 300, described above, and may have identical or substantially identical components and functionality as either of those systems, in addition to the additional features discussed herein with respect to FIGS. 13 and 14. For example, the hoist elevator system 900 may also include at least one floor call station 902, at least one operator panel 904, and at least one car controller 906. The hoist elevator system 900 may include a plurality of floor call stations, such as one per floor of the building under construction. Each hoist elevator car 910 of the hoist elevator system 900 may have an operator panel 904 and a car controller 906 operatively connected thereto. For each hoist elevator car, operator panel 904 may be located within a hoist elevator car 910. As shown, the car controller 906 and the arrival sensor 908 may be located on the outside of the hoist elevator car 910. However, the car controller 906 and the arrival sensor 908 may be located in any other suitable location as well.

Car controller transceiver 912 may be configured to receive and transmit wireless signals in one or more wireless transmission formats. For example, the car controller transceiver 912 may be configured to receive RF signals from each of the floor call stations 902, and to transmit LoRa signals to each of the other car controllers 906 in the hoist elevator operation system.

The arrival sensor 908 may be any suitable sensor that can detect the elevational location of the hoist elevator car 910 to which it is operatively connected. Nonlimiting examples of arrival sensors may include an altimeter or an encoder. In the example illustrated in FIGS. 14 and 15, the arrival sensor 908 is an encoder 914. There may be one arrival sensor 908 operatively connected to each hoist elevator car 910. For a given hoist elevator car 910, the arrival sensor 908 may be installed on the drive shaft of the hoist pinion, or may be configured to the specific hoist being used. The arrival sensor 908, such as encoder 914, monitors and determines elevational, i.e., up and down, movement of the hoist elevator car 910 to which it is operatively connected. The arrival sensor is also operatively connected to the car controller 906, and provides elevational position data to the car controller 906. The elevational position data may be sent as frequently as desirable, such as periodically, or each time there is a change in the elevational position of the hoist car 910. When a hoist elevator car 910 answers a floor call, the arrival sensor 908 provides elevational position data to the car controller 906 indicating that the hoist elevator car 910 has arrived at the called floor. Once a pre-determined time period has passed without further change in the elevational position of the hoist car 910, the car controller 906 may cancel the floor call signal. The pre-determined time period can be any suitable amount of time, but is preferably greater than about 1 second to allow sufficient time to determine that the hoist elevator car 910 has actually stopped as the called floor. The pre-determined time period may be between about 2 to about 8 seconds, such as about 3 seconds, about 5 seconds, or about 6 seconds. The car controller 906 may cancel the floor call signal by sending a cancellation message via the wireless network to the other car controllers 906 in the hoist elevator system. When the other car controllers receive a cancellation message, they each communicate the cancellation to their paired operator panel 904, and the paired operator panel 904 turns off the illumination of the floor icon (e.g., 208) associated with the cancelled call on its display.

Referring to FIG. 14, the car controller 906 may include at least one car controller processor 916, a car controller memory 918, an optical isolator 920, and a car controller transceiver 912 configured to receive and transmit wireless signals in one or more wireless transmission formats. For example, the car controller transceiver 912 may be configured to receive RF signals from each of the floor call stations 902, and to transmit LoRa signals to each of the other car controllers 906 in the hoist elevator operation system. The car controller memory 918 may include at least one non-volatile memory that stores a car controller protocol that, when read and executed by the at least one car controller processor 9116, provides for the control and operation of the operator panel 904 and the hoist elevator car in which the car controller 906 is installed. The optical isolator 920 may filter elevational position data received by the car controller 906 from the arrival sensor 908, in order to determine the precise location of the hoist elevator car 910.

In examples of systems where a remote server is used, the car controller 906 of the hoist elevator car 910 answering the floor call may send an arrival message to the remote server, such as remote server 308 of FIG. 6, and the remote server may direct the arrival message to the car scheduling module, such as car scheduling module 706 of FIG. 12. The car scheduling module 706 may receive and process the arrival message, and then send a cancellation message to the car controllers 906 of each hoist elevator car that causes the graphical user interface of each to alter the relevant floor icon from a selected setting to an unselected setting.

Each floor call station, operator panel, car controller and base station of hoist elevator operation systems of the present technology is preferably weatherproof, meaning that they should be able to withstand exposure to weather conditions within at least normal ranges, including precipitation and wind, without damage or loss of function.

Each floor call station, operator panel, car controller and base station of hoist elevator operation systems of the present technology is also preferably temperature tolerant, meaning that they should be able to withstand a wide range of temperatures, such as at least from about −20° F. to about 145° F., without damage or loss of function.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A hoist elevator operation system comprising:

a floor call station configured to be mounted to a surface at a location within a level of a construction site where a user would be located to call a hoist elevator car, the floor call station including an up indicator button, a down indicator button, and a floor call station transmitter that transmits a floor call message when a user activates the up indicator button or the down indicator button, wherein the floor call message includes a called floor number and a direction of travel associated with the call;

a car controller comprising a wireless transceiver, the car controller being installed in a hoist elevator car, where the wireless transceiver receives the floor call message from the floor call station; and an operator panel installed in the hoist elevator car and operatively paired to the car controller, the operator panel including a display and a control panel, wherein the display of the operator panel includes an up call panel having a floor icon for each floor of the construction site and a down call panel having a floor icon for each floor of the construction site, and the display of the operator panel provides a visual indication of the floor call message, including the called floor number and called direction of travel associated with the call, by illuminating the floor icon for the called floor on the up call panel or the down call panel.

2. The hoist elevator operating system of claim 1, wherein each floor icon includes a floor number and a travel direction arrow.

3. The hoist elevator operating system of claim 1, wherein the floor call station transmitter transmits the floor call message using RF or LoRa signals to the car controller.

4. The hoist elevator operating system of claim 1, wherein the hoist elevator operation system comprises a plurality of floor call stations, and a plurality of hoist elevator cars, each hoist elevator car including a car controller and an operator panel.

5. The hoist elevator operating system of claim 4, wherein each floor call station is configured to transmit the floor call message to each car controller.

6. The hoist elevator operating system of claim 4, wherein the wireless transceiver of each car controller is configured to transmit wireless signals to each other car controller.

7. The hoist elevator system of claim 4, wherein the wireless transceiver of each car controller within the plurality of car controllers is configured to receive RF or LoRa signals from each floor call station and to transmit LoRa signals to each other car controller of the plurality of car controllers.

8. The hoist elevator system of claim 1, wherein the system further comprises a remote server and a base station.

9. The hoist elevator system of claim 8, wherein the remote server sends wireless signals to the car controller and the base station.

10. The hoist elevator system of claim 8, wherein the wireless transceiver of the car controller sends wireless signals to the remote server.

11. The hoist elevator operating system of claim 8, wherein the hoist elevator operation system comprises a plurality of floor call stations and a plurality of car controllers.

12. The hoist elevator operating system of claim 8, wherein the operator panel includes a graphical user interface that provides the visual indication of the floor call message, and the graphical user interface includes a go to floor indicator; wherein the go to floor indicator is modified by the operator panel based on a scheduling message received from the remote server.

13. The hoist elevator system of claim 8, wherein the remote server comprises remote server logic, the remote server logic including a scheduling module.

14. The hoist elevator operating system of claim 1, wherein the operator panel includes a graphical user interface that provides the visual indication of the floor call message, and the graphical user interface includes a plurality of floor icons, each floor icon having at least two operating states.

15. The hoist elevator operating system of claim 14, wherein a first operating state of each floor icon is a selected state, and a second operating state of each floor icon is an unselected state.

16. The hoist elevator operating system of claim 14, wherein each floor icon further has a third operating state, and the third operating state is a current floor state.

17. The hoist elevator operating system of claim 1, wherein the control panel is built into the display in the form of a touchscreen.

18. The hoist elevator system of claim 1, wherein each floor icon on the display of the operator panel further includes a call duration timer.

19. The hoist elevator system of claim 1, wherein the floor call station further comprises an emergency button.

20. A method of operating a hoist elevator system comprising steps of:

sending a floor call message from a floor call station via a wireless network to each of a plurality of car controllers, the floor call station being mounted to a surface at a location within a level of the construction site where a user would be located to call a hoist elevator car, the floor call station, and each car controller being installed in one hoist elevator car in the hoist elevator system, wherein the floor call message includes a called floor number and a direction of travel associated with the call;

receiving the floor call message at each car controller, where each car controller sends the floor call message to an operator panel coupled to the car controller and installed in the same hoist elevator car as the car controller;

displaying the floor call message, including the called floor number and called direction of travel associated with the call, on a display of each operator panel, wherein the display of the operator panel includes an up call panel having a floor icon for each floor of the construction site and a down call panel having a floor icon for each floor of the construction site, by illuminating the floor icon for the called floor on the up call panel or the down call panel; and cancelling the floor call message by the car controller of the hoist elevator car that answers the floor call.

* * * * *